H. M. KUNIHOLM.
TOOL CONTROLLING DEVICE FOR SHAPING MACHINES.
APPLICATION FILED FEB. 21, 1918.
1,291,934.
Patented Jan. 21, 1919.
3 SHEETS—SHEET 2.
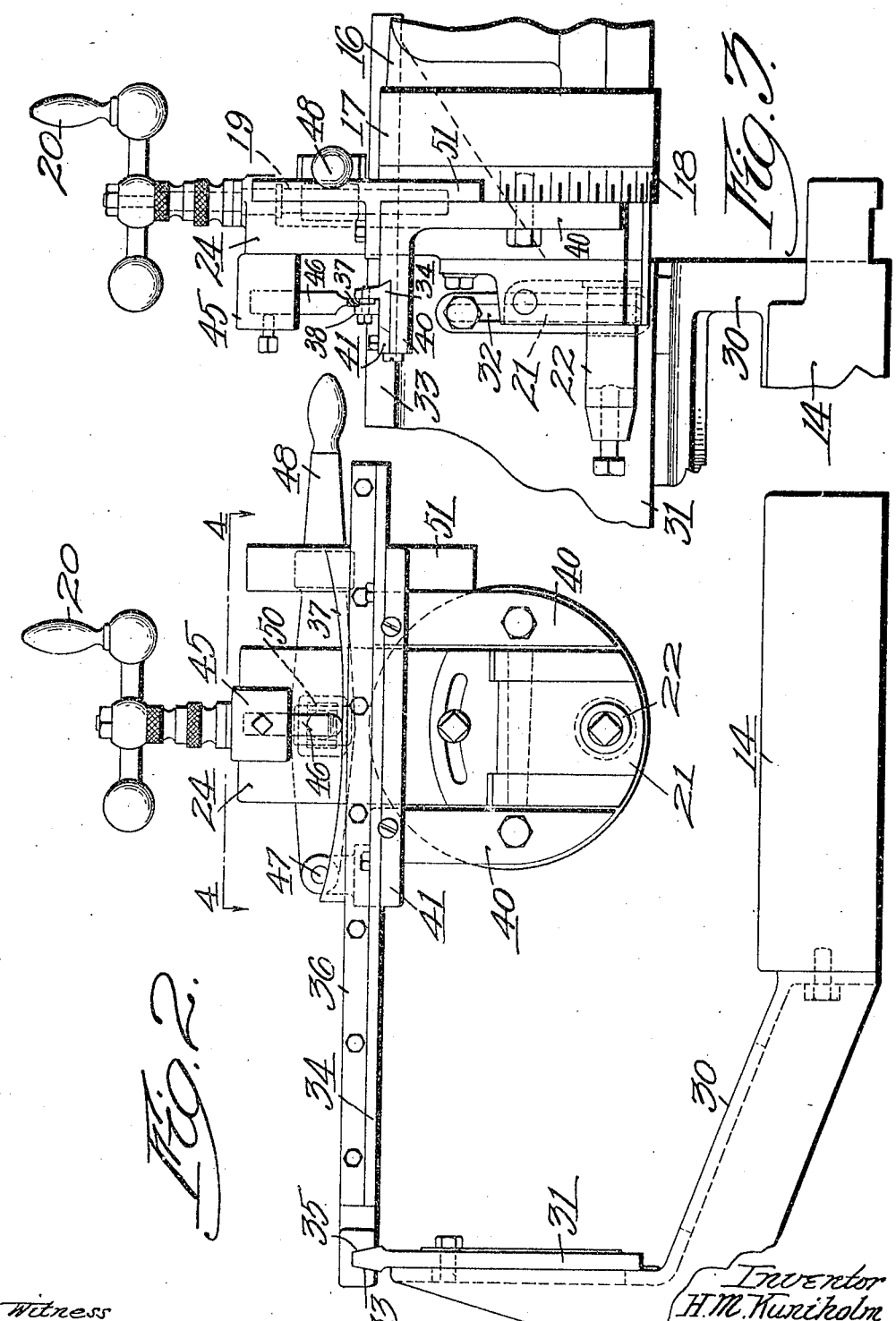

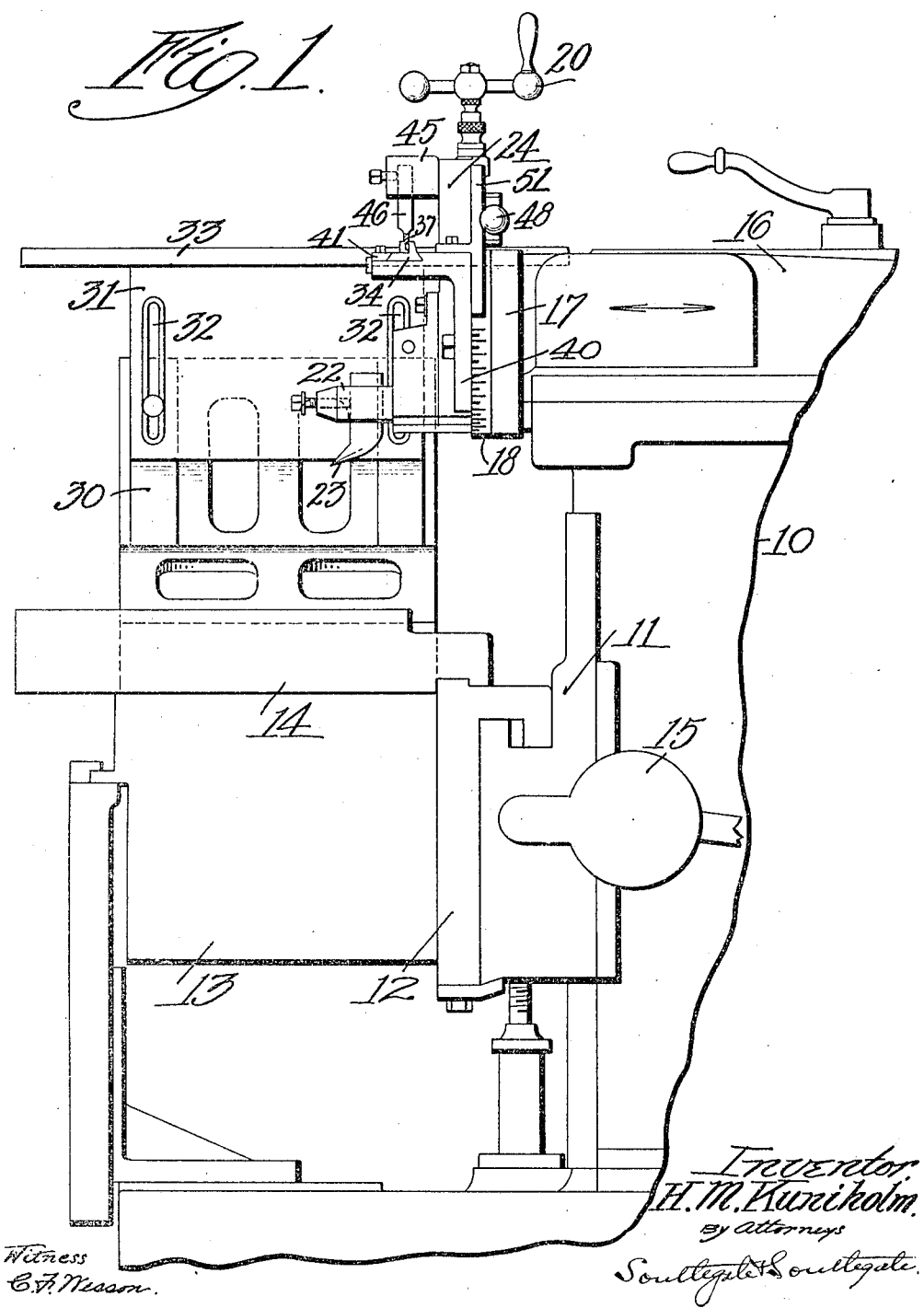

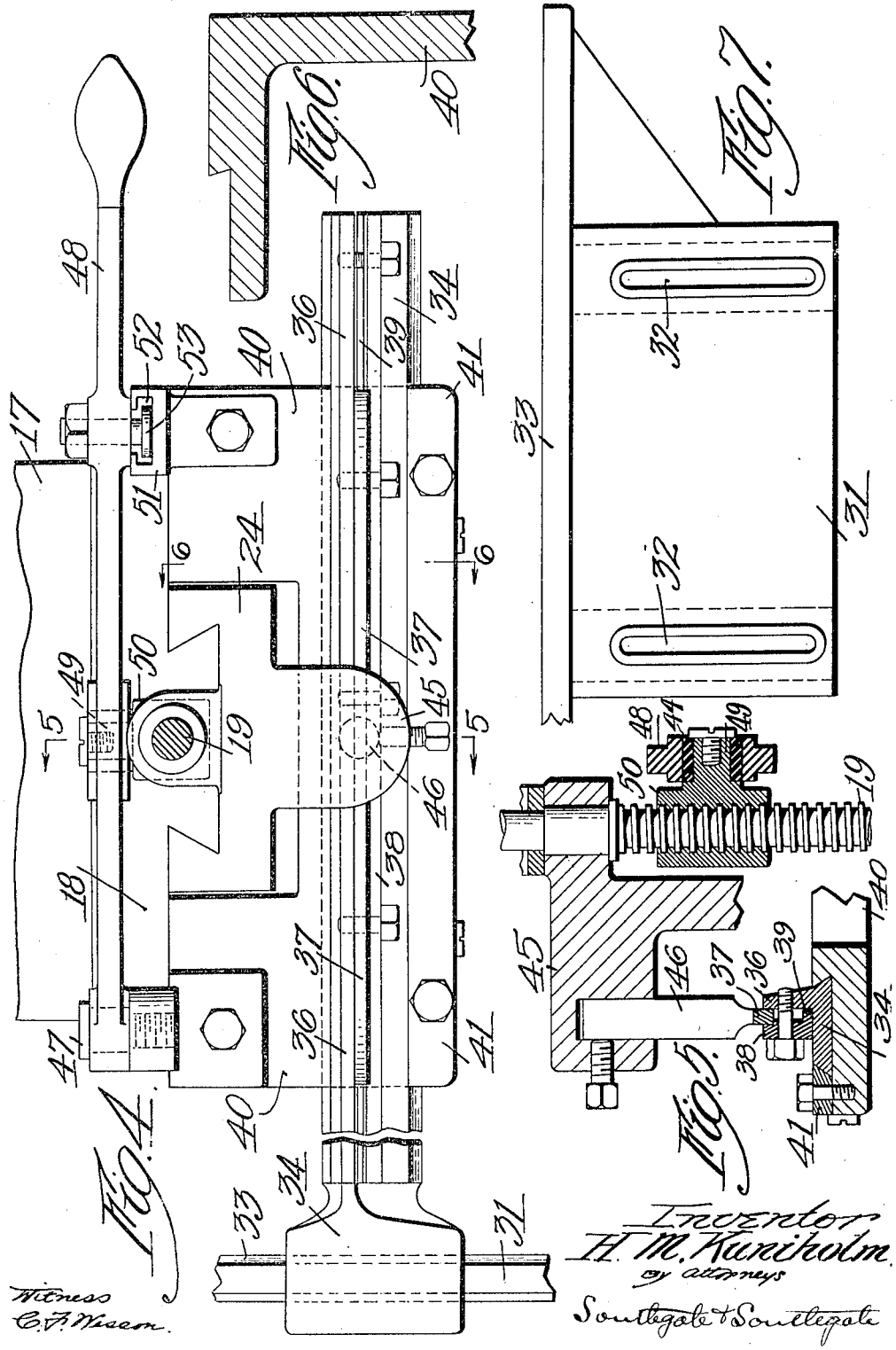

UNITED STATES PATENT OFFICE.

HUGO M. KUNIHOLM, OF GARDNER, MASSACHUSETTS, ASSIGNOR TO STOCKBRIDGE MACHINE COMPANY, A CORPORATION OF MAINE.

TOOL-CONTROLLING DEVICE FOR SHAPING-MACHINES.

1,291,934.                    Specification of Letters Patent.      Patented Jan. 21, 1919.

Application filed February 21, 1918. Serial No. 218,391.

*To all whom it may concern:*

Be it known that I, HUGO M. KUNIHOLM, a citizen of the United States, residing at Gardner, in the county of Worcester and State of Massachusetts, have invented a new and useful Tool-Controlling Device for Shaping-Machines, of which the following is a specification.

This invention relates to a device for attachment to a metal shaping machine or the like for controlling the position of the cutting tool by means of a templet or the like so as to produce irregular or curved surfaces by a cutting operation.

The principal objects of the invention are to provide for controlling the vertical position of the tool at all times during the operation; to provide means whereby the templet is carried preferably with the reciprocating element, but its position thereon is controlled by the other element which is fed transversely to the motion of the reciprocating element, one of said elements of course supporting the work and the other the tool; to provide a templet carrying element of a simple construction and a guide therefor to guide it as the reciprocating element reciprocates and keep it in certain relative position to the feeding element; to provide improved means for supporting the templet on the ram of a shaping machine and yet let it feed across the same, being controlled by the knee table; to provide hand controlled means for lifting the tool relative to the templet whenever desired, and means for guiding the same so that it will not permit side motion of the tool; and to provide improvements in various details and combinations of parts for these purposes capable of general use on metal working machines but particularly adapted for shaping machines. Further objects and advantages of the invention will appear hereinafter.

Reference is to be had to the accompanying drawings, in which—

Figure 1 is a side elevation of a part of a shaping machine showing a preferred embodiment of this invention applied thereto;

Fig. 2 is a front elevation of the attachment, the shaping machine at the rear being omitted for the sake of clearness;

Fig. 3 is a fragmentary side elevation similar to Fig. 1 of the ram and connected parts on enlarged scale, showing the templet in section on a line through the center of the follower;

Fig. 4 is a horizontal sectional view on the line 4—4 of Fig. 2 showing the templet and connected parts in plan on enlarged scale;

Fig. 5 is a sectional view of the same on the line 5—5 of Fig. 4;

Fig. 6 is a sectional view of the templet slide bracket for supporting the templet, and Fig. 7 is a face view of the templet slide guide.

The invention is shown as applied to a metal shaping machine having the usual frame 10, bar 11, saddle 12, knee 13, and knee table 14. Mechanism 15, not shown in detail but well known in this art, is employed for feeding the saddle in accordance with the reciprocations of the ram 16 above and transversely to its motion. This ram is provided with a head 17 having the usual swivel 18 thereon, although the swivel may be omitted as far as this invention is concerned on most kinds of work. A screw 19 with which the slide 24 is movable is connected by a nut 50 with a handle 20 for raising and lowering the slide. This slide carries a clapper box to which is pivoted the usual tool holder or clapper 21 carrying a tool post 22 for supporting the tool 23. The parts so far referred to are common in this art and for that reason they have not been described in detail.

For the purpose of the present invention the knee table 14 is provided with a bracket 30 upon which is mounted a vertical guide 31. In order to provide for adjusting this guide to any desired heights, it has vertical slots 32 for receiving bolts but it will be understood that, these slots being vertical, the guide is fixed so that its top surface is at all times horizontal. This top surface is flanked on both sides by inclined surfaces 33 which constitute a wedge for the whole length of the guide and in fact extend beyond the body thereof as indicated in Fig. 7. This wedge shaped upper end of the guide which occupies a horizontal position constitutes the guide proper for a templet slide 34 which also is located in horizontal position and supported by the ram head as will appear. It is provided with a wedge-shaped notch 35 for receiving the guide surfaces 33. This templet slide 34 is provided with an upwardly extending projection 36 on the side toward the ram and extending throughout its length. It has what is shown as a flat surface on the inner side against which the templet 37 may be clamped by means of a templet clamp 38 bolted to the projection 36. This clamp 38 is provided with a notch for receiving the lower corner of the templet and locking it and with a projection 39 for engaging the bottom of the projection 36 so that the bolts passing through it will firmly clamp the latter at the top, no matter what the thickness of the templet. This slide 34 is supported by a templet slide bracket 40 which is provided with a dovetail recess formed partly integral with it and partly by means of a gib 41 for receiving the flaring bottom of the slide 34 and permitting the same to slide transversely, that is, transversely to the direction of motion of the ram. This bracket is secured to the swivel 18, or if that is not used, directly to the head of the ram by bolts. It is bifurcated to leave a place for the slide 24. It will be seen that the bracket is firmly secured in position and constitutes a firm guide and support for the slide 34. It will be observed that this slide is comparatively long and is supported at the other end by the top of the guide 31 and that it moves along parallel with that guide, taking the templet with it on each reciprocation of the ram and tool.

On the tool slide 24 is an integral projection 45 from which extends downwardly a follower 46 firmly fixed to this projection and terminating at the bottom in a finger which rests on the templet at all times. The weight of the parts holds this follower down on the templet and causes the whole tool holding device to rise and fall in accordance with the shape of the templet as the work is fed transversely under the tool. In the form in which the invention is shown the tool takes a straight cut throughout the length of the work and the shape is secured by changes in the height of the tool as the work feeds transversely.

For the purpose of permitting the operator to control the operation in case too deep a cut is being made, by lifting the tool up to a greater or less extent, the bracket 40 is provided with a pivot pin 47. To this is pivoted a handle 48 which has a slot in which is slidably mounted a rectangular block 44. This receives a stud 49 projecting from a nut 50 adjustable on the screw 19. This is adapted to control the position of the clapper and slide. The operator can lift the handle at any time and thus lift the tool although he cannot depress it below the position to which it is limited by the surface of the templet.

In order to prevent the handle 48 from moving sidewise and accurately guiding it against motion out of its proper position, a guide 51 is shown having a T-shaped slot 52 for receiving a headed stud 53 smaller than the slot. This passes through a boss on the handle 48. The clearance in this slot is provided to permit of the slight change in direction due to the oscillation of the handle about a pivot and in order to avoid the necessity of making an arc shaped slot. The nut on this stud 53 can be tightened up to lock the handle in position and thus permit adjustment of the tool holder by the screw 19.

In the operation of the device the work carried by the knee table will be caused to feed transversely at each reciprocation of the ram carrying the cutting tool as is well understood in this art. As this cutting tool reciprocates the templet goes with it and the follower 46 rests on the templet without any motion relative thereto during a complete working stroke of the ram. This keeps the tool 23 at the same elevation throughout the stroke. The working stroke having been accomplished the knee table feeds transversely between strokes and at that time the guide 31 moves with it and takes the slide 34 a step forward or back as the case may be. This moves the templet along relatively to the follower 46 and may bring the follower and therefore the tool to a different elevation. The next cut is made at the new elevation, and in that way a curved or irregular surface can be cut in a very simple manner.

Although I have shown and described this invention as applied to a particular type of metal shaping machine, I am aware of the fact that the principles herein involved can be applied to other shaping machines, and in fact to metal working machines of other types in which there is a relative motion between the work and the cutting tool, especially a motion of reciprocation. I am also aware of the fact that other modifications can be made in the details of construction without departing from the scope of the invention as expressed in the claims. Therefore I do not wish to be limited in these respects, but what I do claim is—

1. In a metal working machine, the combination of a reciprocable member, a second member adapted to be fed transversely in the intervals between the reciprocations, one of said members being adapted to support the work and the other to carry a cutting tool, a guide carried by one of said members and having a guiding surface parallel with the direction of reciprocation, a slide having a notch for receiving said guide and carried by the reciprocating member so as to move along said guide, said slide being transversely slidable on the reciprocating member, whereby the guide will move it in accordance with the position of the other member.

2. In a metal working machine, the combination of a reciprocable member, a second member adapted to be fed transversely in the intervals between the reciprocations, one of said members being adapted to support the work and the other to carry a cutting tool, a guide movable with said second member and having a guiding surface parallel with the direction of reciprocation of the other, a slide slidably carried by the reciprocating member and having a notch for receiving said guiding surface so as to move along said guide, whereby the guide will move it in accordance with the position of said second member.

3. In a shaping machine, the combination with a reciprocable tool carrying ram and a work supporting table arranged to be fed transversely, of a templet arranged to move broadside with the ram to control the position of a tool carried thereby, and means for feeding the templet with the table transversely to the direction of motion of the ram.

4. In a shaping machine, the combination with a longitudinally reciprocable tool carrying ram and a work supporting table arranged to be fed transversely to the direction of motion of the ram, of a templet arranged to move with the ram to control the vertical position of a tool carried thereby, and means movable with said table and always in operative connection with said templet for feeding the templet transversely to the direction of motion of the ram as the table feeds.

5. The combination with a tool carrying ram and a work supporting table, of a guide bracket carried by said table and having a guide thereon, said guide having a guiding surface at the top arranged parallel with the ram, a slide transversely slidable on the ram and having a notch for engaging said guide, whereby the guide controls the transverse position of the slide, a templet carried by said slide, and means resting against said templet for controlling the position of the cutting tool.

6. In a shaping machine, the combination with a reciprocable tool carrying ram and a work supporting table arranged to be fed transversely step by step, of a guide bracket carried by said table and having a guide vertically adjustable thereon, said guide having a guiding surface at the top arranged parallel with the direction of reciprocation of the ram, a slide transversely slidable on the ram and having a notch for engaging said guide, said guide extending throughout the length of the stroke of the ram, whereby the guide controls the transverse position of the slide throughout its stroke, a templet carried by said slide, and means resting against said templet for controlling the position of the cutting tool.

7. In a shaping machine, the combination with a reciprocable tool carrying ram and a work supporting table arranged to be fed transversely step by step, of a guide bracket carried by said table and having a guide vertically adjustable thereon, said guide having a guiding surface at the top arranged parallel with the direction of reciprocation of the ram, a slide transversely slidable on the ram and having a notch for engaging said guide, whereby the guide controls the transverse position of the slide, said guide extending throughout the length of the stroke of the ram, whereby the guide controls the position of the slide throughout its stroke, a templet carried by said slide, a bracket having dove-tail ways thereon for reciprocably supporting said slide, said bracket being mounted on the ram, and means resting against said templet for controlling the position of the cutting tool.

8. In a shaping machine, the combination of a reciprocable tool carrying ram and a work supporting table adapted to be fed transversely to the direction of motion of the ram, of a templet carried by the ram and extending transversely thereof, means carried by the table for controlling the longitudinal position of the templet in accordance with the position of the table, said templet being mounted on the ram to move positively with it in a direction transverse to the length of the templet, a follower resting on said templet, and a tool holder positively connected with the follower to move with it.

9. In a shaping machine, the combination of reciprocable tool carrying ram and a work supporting table adapted to be fed transversely to the direction of motion of the ram, of a templet carried by the ram and extending transversely thereof, means carried by the table for controlling the longitudinal position of the templet in accordance with the position of the table, said templet being mounted on the ram to move positively with it in a direction transverse to the length of the templet, a follower resting on said templet, and a tool holder positively connected with the follower to move with it, whereby as the table is fed across, the templet will move in the same manner and different portions of the templet will come into contact with said follower successively, and whereby the tool will always make a straight cut throughout a complete stroke.

10. In a shaping machine, the combination with a reciprocable tool carrying ram and a work supporting table arranged to be fed transversely, of a templet arranged to move with the ram to control the position of the tool, means for feeding the templet transversely to the direction of motion of the ram, and hand controlled means for reducing the depth of the cut without adjusting the templet.

11. In a shaping machine, the combination with a reciprocable tool carrying ram and a work supporting table arranged to be fed transversely, of a templet arranged to move with the ram to control the position of the tool, means for feeding the templet transversely to the direction of motion of the ram, a handle provided with means for reducing the depth of the cut without adjusting the templet, and a guide for guiding said handle vertically to prevent sidewise motion thereof.

12. In a shaping machine, the combination with a reciprocable tool carrying ram and a work supporting table arranged to be fed transversely, of a templet arranged to move with the ram to control the position of the tool, means for feeding the templet transversely to the direction of motion of the cut without adjusting the templet, and means for locking said feeding means so as to permit of adjustment of the tool.

In testimony whereof I have hereunto affixed my signature.

HUGO M. KUNIHOLM.

Copies of this patent may be obtained for five cents each, by addressing the "Commissioner of Patents, Washington, D. C."